May 29, 1934.  C. A. POE  1,960,595
MAGNETIC BRAKE FOR RAILWAYS
Filed Dec. 19, 1933
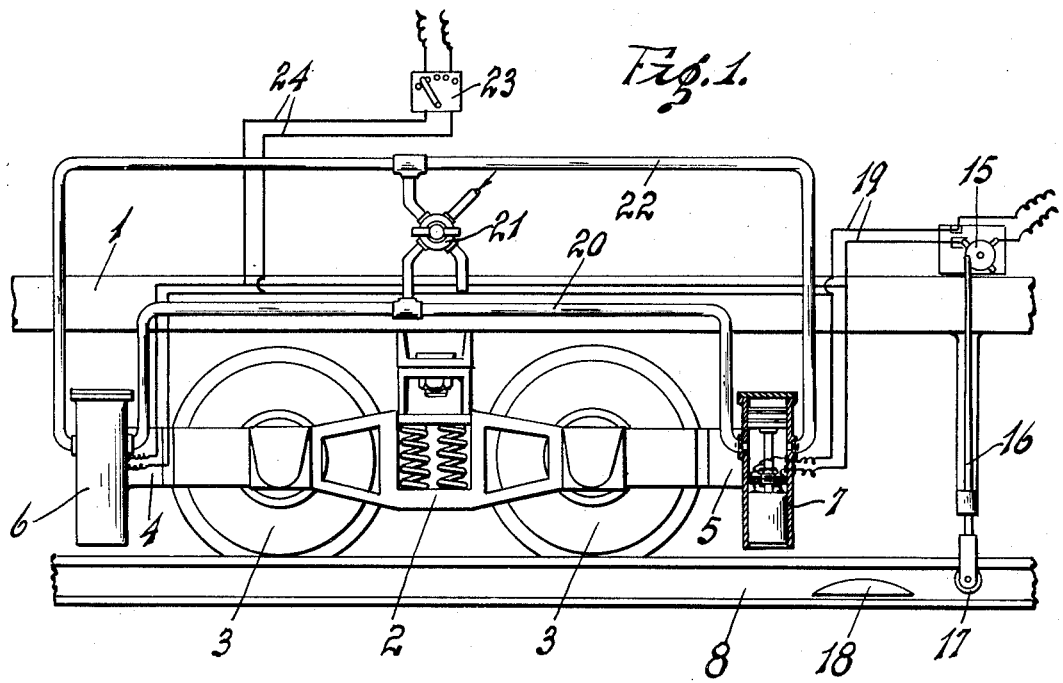
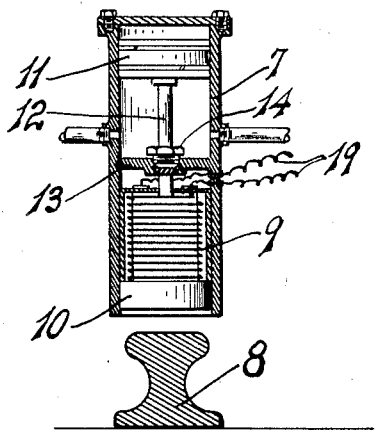
INVENTOR.
CHARLEY A. POE.
BY
*H. A. Druckman*
ATTORNEY.

Patented May 29, 1934

1,960,595

UNITED STATES PATENT OFFICE 1,960,595

MAGNETIC BRAKE FOR RAILWAYS

Charley A. Poe, Long Beach, Calif.

Application December 19, 1933, Serial No. 703,080

8 Claims. (Cl. 188—165)

This invention relates to a magnetic brake for railway cars and engines, which will act both as a brake and as a stabilizer for the cars when traveling around curves.

An object of my invention is to provide a stabilizer which will exert a vertical force on the rails, thereby allowing trains to make higher speed around curves, and also to prevent swaying of the cars.

A further object is to provide a stabilizer which will be automatically operated as the car approaches and leaves a curve.

Still a further object is to provide a stabilizer so mounted on the car trucks as to exert a downward force thruout, holding the wheels in contact with the rails to assist in starting.

A feature of my invention is the fact that the amount of current directed to the electromagnets can be both automatically and manually controlled, and that the spacing of the electromagnets relative to the rail is controllable by a manual valve.

Another feature is that the force exerted by my brake is downwardly, thus eliminating any tendency to lift the wheels off the rails.

Other objects, advantages and features of my invention may appear from the accompanying drawing, the subjoined detailed description, and the appended claims.

In the drawing:

Figure 1 is a fragmentary side elevation of a car chassis showing one of the trucks, and with parts in section to illustrate interior construction.

Figure 2 is a longitudinal sectional view of one of the magnet assemblies.

Referring more particularly to the drawing, the numeral 1 indicates the usual car frame, and 2, the usual truck frame. The wheels 3 are journaled in the truck frame 2 in the usual and well known manner. The truck frame 2 is extended forwardly and rearwardly of the wheels 3—3, as shown at 4 and 5.

Cylinders 6—7 are rigidly attached to the extensions 4 and 5, respectively. The cylinders 6—7 are mounted directly over the rails 8. It is to be understood that there are a pair of cylinders on each side of the car, and if desired, a group of cylinders can be provided on each of the trucks under the car. The construction of the cylinders 6—7 is identical, and only one of them will be described in detail.

An electromagnet 9 is mounted in the cylinder 7 adjacent the lower end thereof, and the metal core 10 of the electromagnet is normally spaced above the top surface of the rail 8.

A piston 11 is mounted in the upper part of the cylinder 7 and a piston rod 12 connects the piston and the electromagnet. A transverse wall 13 is provided in the cylinder above the electromagnet, and a packing gland 14 surrounds the piston rod 12 to prevent leakage around said rod.

A snap switch 15, of usual and well known construction, is positioned on each side of the car and controls the current which is supplied to the electromagnets in the cylinders 6—7.

A trip rod 16 extends downwardly from the snap switch 15, and is provided with a roller 17 on the bottom thereof. A cam 18 is positioned adjacent the rail 8 preferably ahead of and back of each curve, and as the roller 17 strikes this cam, the snap switch 15 will be thrown into and out of contact, thus closing and opening the electrical circuit to the electromagnets.

Leads 19 extend from the switch 15 to the electromagnets and as the switch is closed, a fixed amount of current will be supplied to the electromagnets, thereby exerting a downward pull on the truck frame 2, which will prevent swaying or tipping of the cars traveling around a curve. The electromagnets are held out of contact with the rails when acting as a stabilizer, by the following arrangement:

An air pipe 20 extends to the cylinders 6—7, and air under pressure is admitted into this pipe thru a manually controlled valve 21. The pipe 20 extends into the cylinders under the piston, thus holding the electromagnets out of contact with the rail. When it is desired to utilize the brake, the air pressure is released from the cylinders thru the pipe 22 and thence thru the valve 21. The weight of the electromagnets will then move them downwardly against the top surface of the rail, and current will be supplied to them thru a manually controlled rheostat 23 and leads 24. The amount of current supplied thru the rheostat 23 is normally greater than that supplied thru the switch 15, whereby a greater pull is exerted by the electromagnets. This will have the effect of stopping the car.

Having described my invention, I claim:

1. A magnetic brake for railway cars, comprising a truck frame, cylinders attached to the front and rear ends of said frame, an electromagnet in each of the cylinders, an automatic switch thru which current is supplied to the electromagnets, and means extending to said switch whereby it is automatically opened and closed.

2. A magnetic brake for railway cars, comprising a truck frame, cylinders attached to the front and rear ends of said frame, an electromagnet in each of the cylinders, an automatic switch thru which current is supplied to the electromagnets, a trip rod connected to said switch, and a cam engageable by the trip rod, whereby said switch is actuated.

3. A magnetic brake for railway cars, comprising a truck frame, cylinders secured to the front and rear ends of said frame, an electromagnet in each of the cylinders, a piston in each of the cylinders, a piston rod connecting the piston and the electromagnet, an air pipe extending to each of the cylinders below the pistons whereby the pistons and electromagnets are held in raised position, and a valve in said air pipe.

4. A magnetic brake for railway cars, comprising a truck frame, cylinders secured to the front and rear ends of said frame, an electromagnet in each of the cylinders, a piston in each of the cylinders, a piston rod connecting the piston and the electromagnet, an air pipe extending to each of the cylinders below the pistons whereby the pistons and electromagnets are held in raised position, a valve in said air pipe, a manually controlled rheostat and leads extending from the rheostat to the electromagnets, whereby current is supplied to the electromagnets.

5. A magnetic brake for railway cars, comprising a truck frame, cylinders secured to the front and rear ends of said frame, an electromagnet in each of the cylinders, a piston in each of the cylinders, a piston rod connecting the piston and electromagnet, an air pipe extending to each of the cylinders below the pistons whereby the pistons and the electromagnets are held in raised position, a valve in said air pipe, an intake switch, leads extending from the automatic switch to the electromagnets, and trip means extending to the automatic switch, whereby said switch is automatically opened and closed.

6. A magnetic brake for railway cars, comprising a truck frame, cylinders secured to the front and rear ends of said frame, an electromagnet in each of the cylinders, a piston in each of the cylinders, a piston rod connecting the piston and electromagnet, an air pipe extending to each of the cylinders below the pistons whereby the pistons and the electromagnets are held in raised position, a valve in said air pipe, an intake switch, leads extending from the automatic switch to the electromagnets, a trip arm attached to the switch and depending therefrom, a stationary cam engageable by the trip arm, whereby said switch is actuated.

7. A magnetic brake for railway cars, comprising a truck frame, cylinders secured to the front and rear ends of said frame, an electromagnet in each of the cylinders, a piston in each of the cylinders, a piston rod connecting the piston and the electromagnet, an air pipe extending to each of the cylinders below the pistons whereby the pistons and electromagnets are held in raised position, a valve in said air pipe, a manually controlled rheostat and leads extending from the rheostat to the electromagnets, whereby current is supplied to the electromagnets, a switch, leads extending from the switch to the electromagnets, and trip means attached to the switch, whereby said switch is automatically opened and closed.

8. A magnetic brake for railway cars, comprising a truck frame, cylinders secured to the front and rear ends of said frame, an electromagnet in each of the cylinders, a piston in each of the cylinders, a piston rod connecting the piston and the electromagnet, an air pipe extending to each of the cylinders below the pistons whereby the pistons and electromagnets are held in raised position, a valve in said air pipe, a manually controlled rheostat and leads extending from the rheostat to the electromagnets, whereby current is supplied to the electromagnets, a switch, leads extending from the switch to the electromagnets, a trip arm depending from the switch, a stationary cam engageable by the trip arm, whereby the switch is opened or closed.

CHARLEY A. POE.